W. G. LERCH.
APPARATUS FOR MANUFACTURING PNEUMATIC TIRE CASINGS.
APPLICATION FILED OCT. 25, 1920.
1,381,316.                                              Patented June 14, 1921.
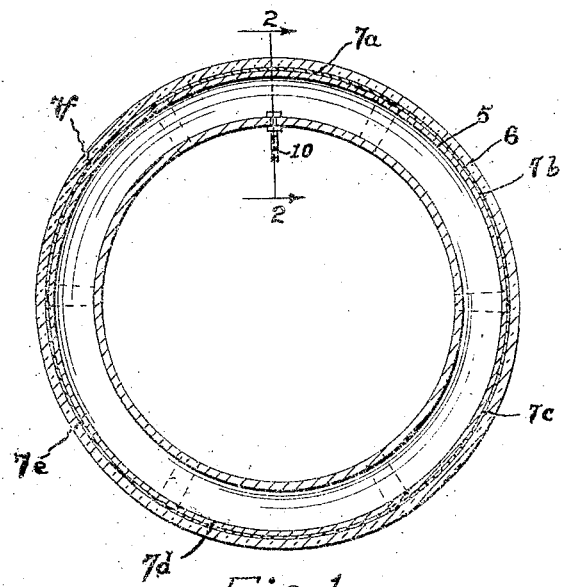
Fig. 1
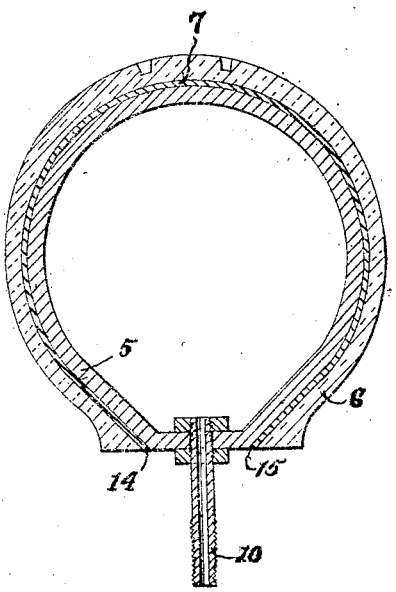
Fig. 2
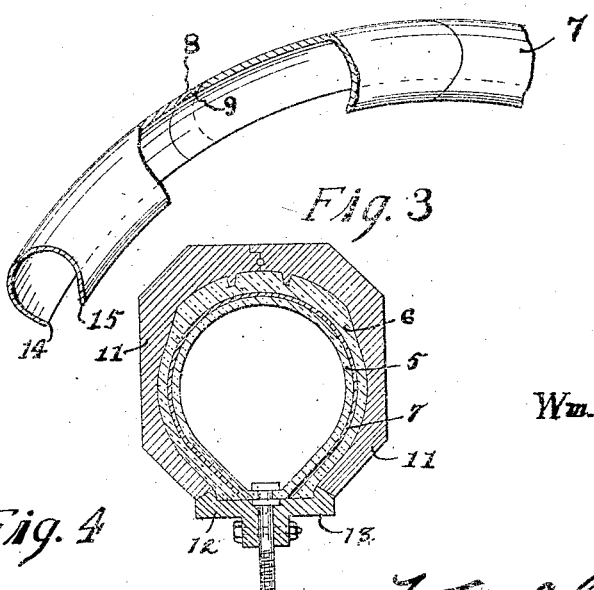
Fig. 3
Fig. 4
Wm. G. Lerch
Inventor
By F. E. Shannon
Attorney

UNITED STATES PATENT OFFICE.

WILLIAM G. LERCH, OF AKRON, OHIO, ASSIGNOR TO THE INDIA TIRE & RUBBER COMPANY, OF MOGADORE, OHIO, A CORPORATION OF OHIO.

APPARATUS FOR MANUFACTURING PNEUMATIC-TIRE CASINGS.

1,381,316.     Specification of Letters Patent.     Patented June 14, 1921.

Application filed October 25, 1920. Serial No. 419,173.

*To all whom it may concern:*

Be it known that I, WILLIAM G. LERCH, a citizen of the United States, residing at Akron, in the county of Summit and State of Ohio, have invented new and useful Improvements in Apparatus for Manufacturing Pneumatic-Tire Casings, of which the following is a specification.

This invention relates to expansible cores for pneumatic tires and particularly to a protective sheath adapted to be inserted between an air bag and a pneumatic tire casing.

In the manufacture of pneumatic tires and particularly, cord tires, the tire casing is built up, an air bag is then placed within the casing and it is placed within the cavity of a tire mold and the air bag is inflated to stretch and compact the casing during vulcanization. Air bags of this character must possess a certain degree of elasticity and are usually composed of rubber reinforced with textile fabric. An air bag must be subjected to a vulcanizing heat, each time a tire is cured thereon and, after a short period of use, it becomes permanently enlarged and wrinkles and folds back upon itself causing buckles in the casing and greatly reducing the strength and usefulness thereof. This results in a considerable financial loss, not only because of an inferior less valuable product, but because the air bag, which is of expensive construction, must be discarded.

It is therefore an object of this invention to provide a protective, expansible sheath of simple, economical construction which in use may be interposed between the interior surface of a pneumatic tire casing and an air bag and which when so used will produce a more perfect product and will greatly lengthen the life of the air bag used in conjunction therewith.

A further object is to provide a protective cover for an air bag which will expand both laterally and longitudinally when fluid pressure is introduced within the bag and which will uniformly distribute the pressure exerted by said fluid.

A still further object is to provide a means whereby tires may be vulcanized on an air bag without the use of highly skilled labor and which will produce a product having a smooth interior surface and consequently, a relatively better product at a relatively lower cost than can be produced by any method heretofore known.

The above objects are accomplished and additional ends are attained by the novel construction, combination and arrangement of parts herein described and shown in the accompanying drawings wherein I have illustrated a preferred embodiment of the invention, it being understood that the invention is capable of various adaptations and that changes, variations and modifications may be made or substitutions resorted to which come within the scope of the claims hereunto appended.

In the drawings, in which similar numerals of reference are employed to designate corresponding parts throughout the several views, Figure 1 is a longitudinal, central, sectional view of a tire casing, showing an air bag positioned therein with my new and improved sheath interposed therebetween.

Fig. 2 is a transverse, sectional view taken as indicated by the lines 2—2 of Fig. 1.

Fig. 3 is a perspective view of a portion of a sheath constructed in accordance with this invention showing the manner in which the several sections are assembled in end to end abutment.

Fig. 4 is a transverse sectional view of a tire vulcanizing mold showing a tire casing therein with an air bag within the casing and illustrating particularly a manner of using my new protective sheath.

Proceeding now to a detailed description of the invention and particularly to a description of the embodiment thereof illustrated in the drawings, the numeral 7 is used generally to denote an annular sheath preferably formed of sheet metal and shaped to conform to the contour of the interior surface of a pneumatic tire casing. The said sheath 7 is made up of a plurality of separable sections $7^a$, $7^b$, $7^c$, $7^d$, and $7^e$ adapted when placed in overlapping end to end abutment to form an annulus which will expand both laterally and longitudinally. One end of each of said sections is provided with an overlapping knife-like edge 8 and the other end thereof with an overlapped knife-like edge 9 so that when placed in end to end abutment the sheath has a smooth, continuous interior and exterior surface.

The numeral 5 is used to denote an air bag which may be of ordinary or improved construction and which is provided with an inflation stem 10. The numeral 6 is used to indicate a pneumatic tire casing and the numeral 11 the ordinary two part mold in which said casing is vulcanized.

In use, the tire 6 is built up on a solid core. The core is then removed and the sections 7$^a$, 7$^b$, 7$^c$, 7$^d$ and 7$^e$ are placed within the cavity of the casing in end to end abutment as shown in Figs. 1 and 2. An air bag 5 is then placed within the sheath 7 and the rings 12 and 13 are secured on each side of the inner circumferential edges of the casing. The inflation stem 10 is then connected to an air compressor or other source of air supply and the air bag 5 is inflated. As the air bag 5 expands the inner circumferential edges of the sheath 7 will be forced laterally apart and the end 8 of each section will slide on the end 9 and the sheath will thus be expanded both laterally and longitudinally.

In practice, the air bag may thus be secured within the tire and the tire secured within the cavity of the two part mold 11. The bag may then be inflated and the casing stretched and compacted between the sheath 7 and the interior surface of the mold 11.

It will thus be seen that I have provided a simple, effective means whereby an air bag may be used to expand a tire during vulcanization and which when so used will produce a smooth, continuous surface on the interior of a casing vulcanized thereon.

Having thus described my invention what I claim as new and desire to secure by Letters-Patent is:—

1. A protective sheath of the class described, comprising a plurality of sections of sheet metal adapted when placed in overlapping end to end abutment to form an annulus, each of said sections being arched laterally and longitudinally to conform to the interior surface of a pneumatic tire casing.

2. A protective sheath of the class described comprising an annulus of sheet metal shaped to conform to the interior contour of a pneumatic tire casing, said annulus comprising a plurality of separable sections, the end of each section terminating in a knife-like edge, each section adapted when brought into end to end abutment with an adjacent section to form an overlapped joint therebetween.

3. An expansible tire vulcanizing core comprising an inflatable annular tube and a covering therefor, said covering comprising a plurality of separable sections composed of sheet metal, arched laterally and longitudinally in conformity with the interior surface of a pneumatic tire casing.

4. In combination with a pneumatic tire casing, an annular inflatable air bag therein, a protective sheath interposed therebetween, said sheath comprising a plurality of separable sections, adapted when placed in overlapping end to end abutment to conform to the contour of the interior surface of said casing, and means to confine said air bag in said casing.

5. In combination with a tire vulcanizing mold, a tire casing therein, an inflatable tube in said casing, and a metallic sheath interposed between said tube and the interior surface of said casing, said sheath comprising a plurality of separable sections adapted when placed in overlapping end to end abutment to form an annulus conforming in shape to the interior surface of said casing and being substantially coextensive therewith.

6. A protective sheath of the class described, comprising a plurality of sections of sheet material adapted when placed in overlapping end to end abutment to form an annulus conforming in shape to the interior surface of a pneumatic tire casing.

7. In combination with an expansible annular air bag of the class described a protective sheath therefor, said sheath comprising a plurality of similar sections of substantially rigid sheet material adapted when placed on overlapping end to end abutment to cover the interior surface of a pneumatic tire casing.

In testimony whereof I have hereunto set my hand.

WILLIAM G. LERCH.